(12) United States Patent
Ehrlich et al.

(10) Patent No.: US 6,675,640 B2
(45) Date of Patent: Jan. 13, 2004

(54) AXLE END WHEEL SENSOR FOR A VEHICLE, SUCH AS A TRUCK OR A TRAILER

(75) Inventors: Donald J. Ehrlich, Lafayette, IN (US); Rodney P. Ehrlich, Monticello, IN (US); Gerard O. McCann, Lafayette, IN (US); James B. Brown, Jr., Lafayette, IN (US)

(73) Assignee: Wabash Technology Corporation, Naperville, IL (US)

( * ) Notice: Subject to any disclaimer, the term of this patent is extended or adjusted under 35 U.S.C. 154(b) by 210 days.

(21) Appl. No.: 09/747,119

(22) Filed: Dec. 21, 2000

(65) Prior Publication Data
US 2001/0052258 A1 Dec. 20, 2001

Related U.S. Application Data
(60) Provisional application No. 60/171,741, filed on Dec. 22, 1999.

(51) Int. Cl.[7] .............................................. G01M 15/00
(52) U.S. Cl. ...................................................... 73/118.1
(58) Field of Search ............................. 73/117.2, 117.3, 73/118.1, 488, 493, 494

(56) References Cited

U.S. PATENT DOCUMENTS

| | | |
|---|---|---|
| 2,580,677 A | 1/1952 | Hadley |
| 2,920,156 A | 1/1960 | Rice et al. |
| 3,450,850 A | 6/1969 | Raschke |
| 3,614,731 A | 10/1971 | Hluchan et al. |
| 3,827,024 A | 7/1974 | Anderson et al. |
| 3,887,046 A | 6/1975 | Bueler |
| 3,910,386 A | 10/1975 | Stigall et al. |
| 3,915,266 A | 10/1975 | Lantz |
| 3,916,234 A | 10/1975 | Stigall et al. |
| 3,929,308 A | 12/1975 | Armstrong et al. |
| 3,985,393 A | 10/1976 | Jovick |
| 3,998,298 A | 12/1976 | Fleagle |
| 4,013,954 A | 3/1977 | Deem et al. |
| 4,027,753 A | 6/1977 | Lantz |
| 4,142,152 A | 2/1979 | Fincher |
| 4,316,175 A | 2/1982 | Korber et al. |
| 4,761,146 A | 8/1988 | Sohoel |
| 4,784,444 A | 11/1988 | McCann et al. |
| 4,843,885 A | 7/1989 | Bambara |
| 4,987,774 A | 1/1991 | De Waal |
| 5,011,302 A | 4/1991 | Mott et al. |
| 5,029,477 A | 7/1991 | Bambara |
| 5,056,237 A | 10/1991 | Saunders |

(List continued on next page.)

FOREIGN PATENT DOCUMENTS

WO wo 9811356 3/1998

OTHER PUBLICATIONS

Analog Devices—Low Cost, Current Output Temperature Transducer; Analog Devices, Inc., 1996.
3421 and 3422—Hall–Effect, Direction–Detection Sensors, Sep. 29, 1998.
Achsen für Europa, Sonderdruck aus vom. Dec. 6, 1990.
An International Search Report which issued in connection with International Application No. PCT/US00/35119.

Primary Examiner—Eric S. McCall
(74) Attorney, Agent, or Firm—Trexler, Bushnell, Giangiorgi, Blackstone & Marr, Ltd.

(57) ABSTRACT

A system for a vehicle includes a hollow axle, a wheel hub which surrounds the axle, bearings provided therebetween, at least one nut having a predetermined inner diameter mounted on an end of the axle, and a hub cap mounted to the wheel hub. An exciting element is mounted within the hub cap by a mounting wheel. A sensor member is mounted in the end of the axle and radially spaced from the exciting element. The sensor member has an outer diameter which is less than the inner diameter of the nut such that the wheel hub, the bearings, the nut, the hub cap, the exciting element and the mounting wheel can be removed without having to remove the sensor member from the axle.

19 Claims, 5 Drawing Sheets

U.S. PATENT DOCUMENTS

| | | |
|---|---|---|
| 5,132,665 A | 7/1992 | Hutchisson et al. |
| 5,150,618 A | 9/1992 | Bambara |
| 5,381,090 A | 1/1995 | Adler et al. |
| 5,381,692 A | 1/1995 | Winslow et al. |
| 5,477,735 A | 12/1995 | Li |
| 5,486,759 A | 1/1996 | Seiler et al. |
| 5,509,310 A | 4/1996 | El-Ibiary |
| 5,549,362 A | 8/1996 | Broome |
| 5,551,917 A | 9/1996 | Wood |
| 5,574,366 A | 11/1996 | Joost |
| 5,591,910 A | 1/1997 | Lin |
| 5,769,545 A | 6/1998 | Bently et al. |
| 5,788,339 A | 8/1998 | Wood et al. |
| 5,792,956 A | 8/1998 | Li |
| 5,806,938 A | 9/1998 | Stumpe et al. |
| 5,959,365 A | 9/1999 | Mantini et al. |
| 6,026,348 A | 2/2000 | Hala |
| 6,092,029 A | 7/2000 | Bently |
| 6,100,809 A | 8/2000 | Novoselsky et al. |
| 6,142,672 A | 11/2000 | Bently et al. |
| 6,179,471 B1 | 1/2001 | Moretti et al. |
| 6,343,844 B1 | 2/2002 | McCann et al. |

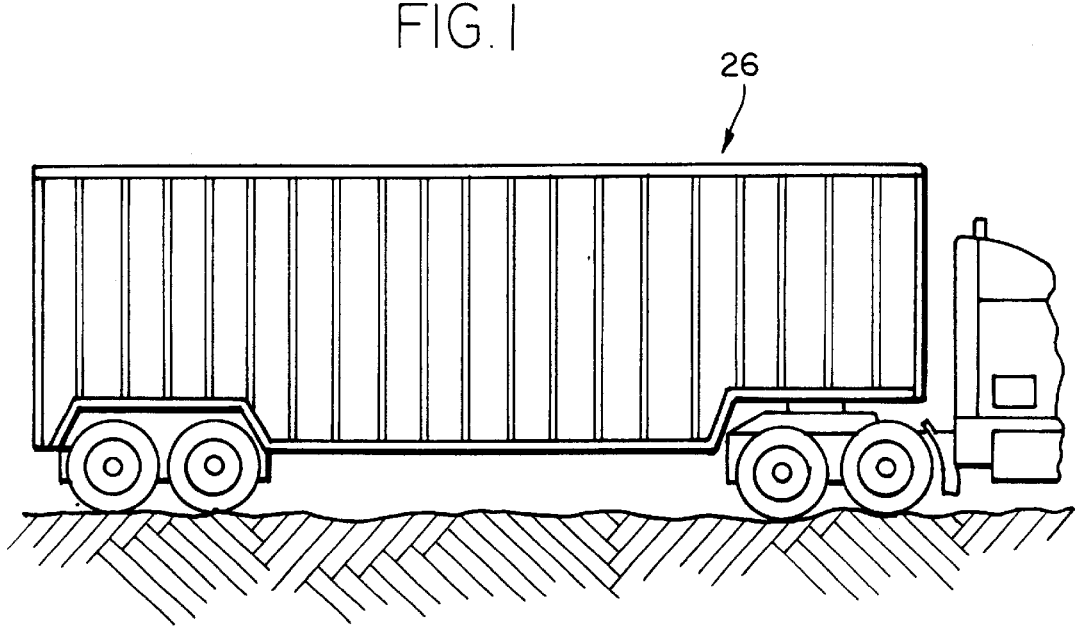
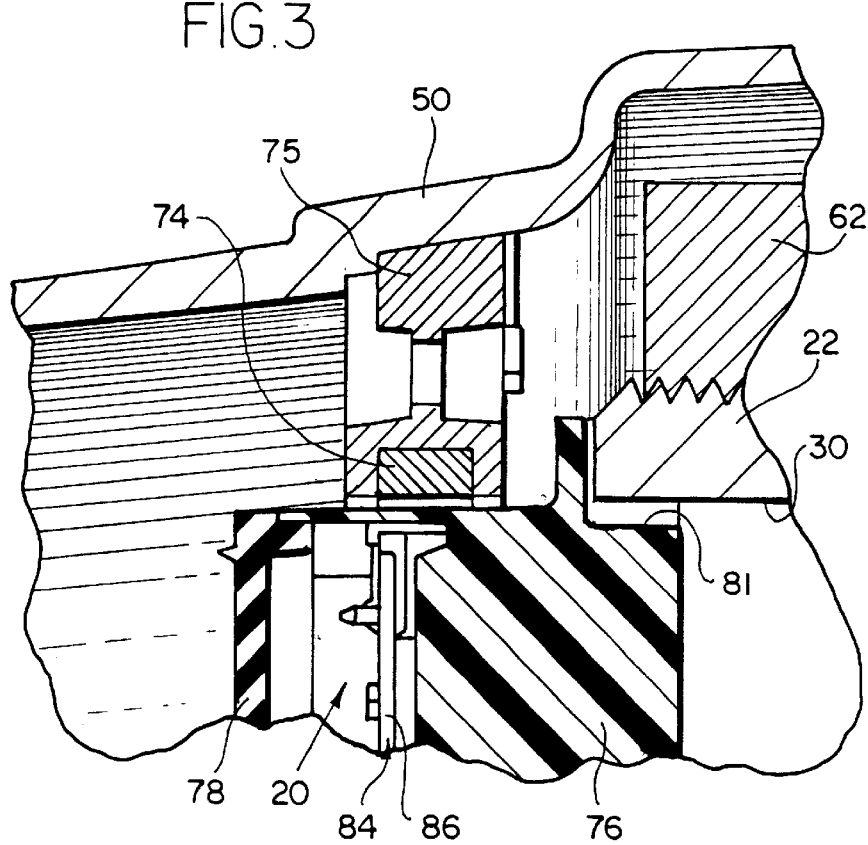

AXLE END WHEEL SENSOR FOR A VEHICLE, SUCH AS A TRUCK OR A TRAILER

This application claims the priority of provisional application Serial No. 60/171,741, filed on Dec. 22, 1999, and entitled "Sensing System For a Trailer Wheel".

BACKGROUND OF THE INVENTION

This invention is generally directed to a novel wheel speed sensor for a vehicle, such as a truck or a trailer.

Anti-lock brake systems (ABS) for air braked truck trailers are in common use and generally include an Electronic Control Module (ECM), Pneumatic Control Module (PCM) and wheel speed sensors. The various components may be known by different names, for example the ECM is sometimes called the Electronic Control Unit (ECU). The PCM may be known as a modulator. Some ABS implementations integrate the PCM into another component known as the relay valve.

The wheel speed sensors provide wheel speed information to the ECM and the ECM signals the PCM to modify air pressure level at the brake chambers. This whole process controls the braking level so that the wheels continue to rotate, or at least rotate most of the time, even during heavy braking. The overall process is described in detail in numerous patents and in co-pending U.S. patent application Ser. No. 09/306,921 which is commonly owned by the assignee herein.

As noted, the wheel speed sensors determine the speed of the wheels and send this information, in an electrical format, to the ECM. Typically, current production ABS systems for heavy trucks and trailers use what are known as variable reluctance (VR) sensors. They are based on well-established technology and are available from numerous suppliers.

The current industry standard sensing mechanism uses a VR sensor together with a toothed ring which is fitted to the back of a wheel hub in the wheel mounting assembly. The VR sensor consists of a magnet, a coil of wire and a metal (soft iron) pole piece, all of which are enclosed in a cylindrical casing of about 2½ inches long and ⅝ inches in diameter. The toothed ring generally has one hundred teeth. As the wheel rotates, magnetic flux through the coil of wire in the VR sensor is present to a greater or lesser degree depending on whether or not a tooth from the toothed ring is directly over the pole piece in the face of the VR sensor. This changing flux induces an alternating voltage in the coil of wire. Its frequency is proportional to the speed of the wheel and the proportionality relationship is about 14 Hertz (cycles per second) per mph. The frequency signal is used by the ECM to determine the speed of the wheel. The amplitude of the signal also increases with wheel speed but the amplitude information is not used directly by the ECM.

The VR sensor is located in a bore in a metal block which is welded to the axle behind the wheel hub. A sleeve within the bore retains the VR sensor so that the face of the VR sensor remains close to the toothed ring. The VR sensor is installed by pushing the VR sensor through the bore from behind until the face contacts the toothed ring. In service, axial movements of the wheel hub pushes the VR sensor back several thousandths of an inch so that most of the time the face of the VR sensor does not actually touch the toothed ring.

The waveform generated by the VR sensor is approximately sinusoidal. As noted above, its frequency is directly proportional to wheel speed and its amplitude also increases as speed increases. The amplitude is also highly dependent on the gap between the face of the VR sensor and the toothed ring.

The VR sensors used in the prior art do not measure "zero" speed. The VR sensors generate voltage in response to changing magnetic flux but the VR sensors do not respond to absolute flux levels. As such the VR sensors cannot determine whether the pole of the VR sensor is opposite a tooth or opposite a gap if the toothed ring is stationary. Very slow rates of rotation, for example below one mph depending on sensor gap, do not generate enough alternating voltage for the ECM to determine that rotation is actually occurring.

Passenger car ABS sensing technology sometimes uses "active" sensors. They have a semiconductor type element to replace the coil of wire in conventional VR sensors. This semiconductor type element measures the actual level of magnetic flux, not a rate of change. These active sensors can measure close to "zero" speed as the active sensors respond to each change from a tooth to a gap, or vice versa, regardless of speed. For active sensors, the toothed ring is sometimes replaced by a circular multi-pole magnet which may be considered to be an exciting element or ring.

In addition to the semiconductor type sensing element, the active sensors also require integrated electronic circuitry to amplify the signal to reasonable levels for transmission to the ECM. Hence, active sensors use several "active" electronic components. Either a two or a three-wire connection to the ECM is required. Approximate square wave signals with levels of zero and five volts for a three-lead design and with a current variation of several milliamps for a two-lead design are typical.

From a functional perspective, "zero" speed sensing, of itself, does not provide significant advantage for a simple trailer ABS product. However in certain circumstances, this active technology provides implementation advantages. Also, as will be discussed here, this technology allows easier implementation of certain features which can be added to a basic trailer ABS product.

With current practice in the heavy truck industry, the sensor 10 is mounted axially and the face of the sensor 10 is perpendicular to the axle 11, see FIG. 7. This arrangement results in a number of technical imperfections, particularly in the context of VR sensing technology. The state of bearing adjustment determines how precisely the wheel hub 12 is constrained in an axial direction. Thus if the bearing adjustment is allowed to become sloppy, the wheel hub 12 can move axially in service. In fact, certain bearing adjustment procedures require some degree of allowed axial movement. The axial movement is sometimes called "endplay" in the heavy truck industry. For example, a requirement for 0.008 inches of endplay is not uncommon. Axial slack results in an increased gap between the face of the sensor 10 and the toothed ring 13. The first effect is a lower amplitude signal. In addition, rapid in-service axial movements of the wheel hub 12 can occur due to tire impact with potholes and other imperfections. Even cornering forces can cause significant axial movement. These effects result in major imperfections to the ideal sinusoidal voltage waveform from the sensor 10. Both amplitude modulation and lower frequency added components result from the varying gap.

Depending on the severity, these effects combine to the extent that the ECM cannot operate optimally in all circumstances and minor imperfections in control performance result. For even greater degradation, the ECM determines that the signal is unusable and ABS system shutdown and warning lamp illumination results.

Another issue with the prior art sensing systems is that the signal is sensitive to any run out in the toothed ring at the back of the wheel hub. If the plane of the face of the teeth is not perpendicular to the axis of rotation, the gap to the face of the sensor varies as the wheel rotates. This variation causes effects (amplitude modulation and lower added frequency components) similar to the loose bearing adjustment noted above. In this case, for a one kHz waveform (about seventy mph), the unwanted components are at a frequency of ten Hz.

The geometrical arrangement normally used for passenger car ABS systems is in contrast to that just described. The face of the sensor is normally parallel to the axle shaft. The bearings maintain a constant gap between the sensor and the toothed ring so the above mentioned defects are practically non-existent. The gap does not vary, except perhaps by a minimal amount, as axial motion of the wheel hub occurs.

In general, it is required to have relative rotation between an element similar to the toothed ring and an element similar to the sensor itself. It is also clear that connecting wires are needed to carry the signal back to the ECM. In the context of a trailer axle, the relative motion is between the wheel hub and the axle. The need for connecting wires implies, in practice, that the sensing element is stationary and that the toothed ring rotates. It is clear that the conventional approach with a toothed ring at the back of the wheel hub and a stationary sensor attached to the axle does meet these basic requirements. However, this arrangement has the drawbacks mentioned herein. The present invention provides a novel alternative this system.

In a prior system, a toothed ring 14 is attached to the inside of a special hub cap 15 and rotates with the hub cap 15, see FIG. 8. The sensing element 16 is attached to the end of the stationary hollow axle 17 and wires exit through the axle 17.

In principal, very good technical performance is achievable from such sensing elements 16. Similar to passenger car ABS technology, the sensing face is parallel to the axis of rotation. Consequently, a constant gap is maintained by the bearings 18. Axial movement of the wheel hub 19 does not have a significant effect. No gap adjustment is required. The gap is set by design, and gap variation is directly controlled by the bearings 18. However, the gap is dependent on the concentricity of the mounting of the toothed ring 14 within the hub cap 15. The use of multiple coils of wire and/or pole pieces in the sensing element 16 may be used to provide partial electrical compensation for run out or other imperfections in the construction or mounting of the toothed ring 14.

However, to remove the wheel hub 19, the mechanic has to remove and reinstall the sensing element 16, including wiring connections. Personnel who are involved in wheel end maintenance now have to pay attention to another set of requirements including the handling of delicate sensing elements and wiring connections. As already noted, the eccentricity of the toothed ring 14 may be difficult to control. It is believed that the toothed ring in a prior art sensor was fabricated from a stamped band which was subsequently formed into a circle. Partial electrical compensation is possible in the sensing element at added cost.

The present invention provides a novel configuration for a wheel speed sensor for a vehicle, such as a trailer which overcomes the problems presented in the prior art. This and other features and advantages will become apparent upon a reading of the attached specification in combination with a study of the drawings.

OBJECTS AND SUMMARY OF THE INVENTION

A general object of the present invention is to provide a novel configuration for a wheel speed sensor for a vehicle, such as a truck or a trailer.

An object of the present invention is to provide a wheel speed sensor which allows the wheel mounting apparatus to be removed from the axle without removing the wheel speed sensor.

Another object of the present invention is to provide a wheel speed sensor which has a sensing face parallel to the axis of rotation of the axle and senses an exciting, element which is radially spaced therefrom, such that the gap between the wheel speed sensor and the exciting element is maintained by the wheel bearings.

A further object of the present invention to provide a wheel speed sensor which is not significantly effected by movement of the wheel hub.

An even further object of the present invention is to provide a wheel speed sensor which does not require gap adjustment.

Briefly, and in accordance with the foregoing, the present invention discloses a system for a vehicle, such as a truck or a trailer. The system includes a hollow axle, a wheel hub which surrounds the axle, a plurality of bearings provided between the axle and the wheel hub, at least one nut mounted on an end of the axle, and a hub cap mounted to the wheel hub. The nut has a predetermined inner diameter and is used to properly position the bearings on the axle along with structure on the axle and the hub cap. An exciting element is mounted within the hub cap by a mounting wheel. A sensor member is mounted in the end of the axle and radially spaced from the exciting ring. The sensor member senses the exciting ring and sinks current from a current supplying controller on the vehicle via suitable wiring. The controller determines the speed of rotation of the wheel hub by determining the magnitude of the current sink. The sensor member has an outer diameter which is less than the inner diameter of the nut such that the wheel hub, the bearings, the nut, the hub cap, the exciting ring and the mounting wheel can be removed without having to remove the sensor member from the axle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view of a trailer and a partial side elevational view of a tractor on which the wheel speed sensor of the present invention is used;

FIG. 3 is an enlarged section of FIG. 2;

DETAILED DESCRIPTION OF THE ILLUSTRATED EMBODIMENT

Figure 2:
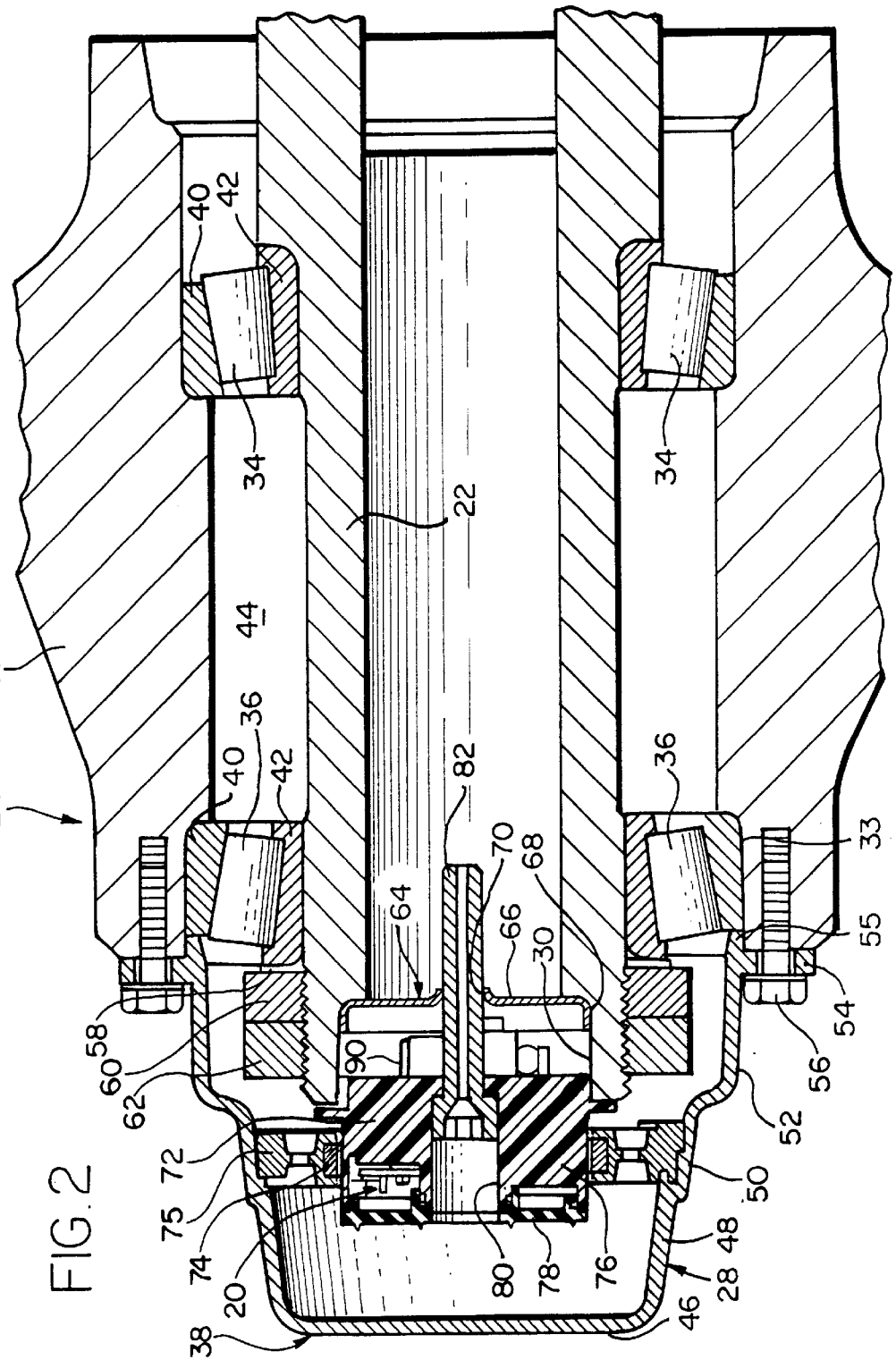
FIG. 2 is a partial cross-sectional view of an axle and a cross-sectional view of a wheel mounting apparatus which includes the wheel speed sensor which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel wheel speed sensor 20 which is mounted in the end of an axle 22 of a wheel mounting apparatus 24 of a vehicle, such as a trailer 26, as shown in FIG. 1.

The wheel mounting apparatus 24 generally includes a wheel hub assembly 28 and a brake assembly (not shown). The wheel hub assembly 28 and the brake assembly are mounted on the axle 22. The brake assembly is of known construction and as such is not described in detail herein.

The axle 22 is fixedly mounted on the body of the trailer 26 by suitable means and is formed from a hollow tube (only one end of which is shown). The ends of the hollow low axle 22 have a thread form on the exterior surface thereof. The inner surface of each end of the axle 22 has a portion 30 which has an increased inner diameter relative to an inner diameter of a central portion of the axle 22. The axle 22 is formed from a suitable strong rigid material.

The wheel hub assembly 28 is mounted on the end of the axle 22 and generally surrounds the axle 22. The wheel hub assembly 28 includes a wheel hub 32, a plurality of inner bearings 34, a plurality of outer bearings 36, and a metal hub cap 38. The wheel hub 32 is attached to the brake drum by suitable known means, such as bolts. The wheel hub 32 has a portion 33 which is precisely machined in the end thereof to provide a larger inner diameter and a shoulder.

The inner and outer bearings 34, 36 are mounted between the wheel hub 32 and the axle 22 by respective bearing cups 40 and bearing cones 42 and allow for rotation between the fixed axle 22 and the rotating wheel hub assembly 28 and brake assembly. The outer bearings 36 are mounted in the portion 33 such that the bearing cups 40 abut against the shoulder formed by the portion 33. This precisely mounts the outer bearings 36 on the wheel hub 32 and therefore, with respect to the axle 22. The inner and outer bearings 34, 36 are mounted at locations which are spaced apart from each other along the length of the axle 22 such that a cavity 44 is provided between the wheel hub 32, the axle 22 and the bearings 34, 36. A bath of oil or semi-fluid synthetic grease is contained within the cavity 44. The bearings 34, 36 are lubricated by the bath of oil or semi-fluid synthetic grease contained therewithin.

The hub cap 38 surrounds the end of the axle 22 and prevents the oil or grease from leaking out of the end of the wheel hub assembly 28. The hub cap 38 includes an outer end wall 46, a first side wall 48, a second side wall 50, a third side wall 52 and an inner end wall 54. The walls 46, 48, 50, 52, 54 are integrally formed with each other. The outer end wall 46 is circular. The first side wall 48 is generally perpendicular to the outer end wall 46 and has a first end connected to the outer end wall 46 and tapers from its first end to its second, larger end. The second side wall 50 has, a first end connected to the second end of the first side wall 48 and tapers from its first end to its second, larger end. The third side wall 52 has a first end connected to the second end of the second side wall 50 and tapers from its first end to its second, larger end. The inner end wall 54 is annular and is generally perpendicular to the third side wall 52 and has a first end connected thereto and extends outwardly therefrom. The inner end wall 54 is parallel to the outer end wall 46. A plurality of apertures are provided through the inner end wall 54 through which the hub cap 38 is attached to the end of the wheel hub 32 by suitable means, such as bolts 56.

The third side wall 52 has an end portion 55 which extends past the inner end wall 54. When the hub cap 38 is mounted on the wheel hub 32, the end portion 55 seats within the portion 33 of the wheel hub 32 and abuts against the cones 40 of the outer bearings 36. This locates the hub cap 38 precisely on the wheel hub 32 and on the axle 22.

A washer 58 is mounted on the threaded end of the axle 22 and bears against the bearing cones 42 of the outer bearings 36. An inner adjusting nut 60 is threaded onto the threaded end of the axle 22 and bears against the washer 58. The adjusting nut 60 is locked onto the axle 22 by threading an outer jam nut 62 on the threaded end of the axle 22. The adjusting nut 60 is used to properly position the bearing cups 42 of the outer bearings 36. The washer 58, the inner adjusting nut 60 and the outer jam nut 62 are proximate to the third side wall 52 of the hub cap 38. The washer 58, the inner adjusting nut 60 and the outer jam nut 62 do not completely fill the space between the axle 22 and the hub cap 38 such that a space is formed therebetween. It is to be understood that other components can be threaded on the end of the axle 22 to properly position the outer bearings 36.

A freeze plug 64 sits within and fills the end portion 30 of the axle 22. The freeze plug 64 has a circular central portion 66 and an annular skirt 68 which depends therefrom. The skirt 68 tightly engages with the inner surface of the end portion 30 of the axle 22. A central aperture 70 and a second aperture (not shown) therethrough which is offset from the central aperture 70 are provided through the central portion 66 of the freeze plug 64. A grommet (not shown) is provided within the second aperture. The freeze plug 64 prevents oil or grease from entering into the axle 22 and prevents debris from going from within the axle 22 outwardly therefrom.

The wheel speed sensor 20 includes a sensor member 72 and an exciting ring 74. The sensor member 72 is mounted in the end of the axle 22 and is spaced from the freeze plug 64. The exciting ring 74 is mounted on the hub cap 38 by a mounting wheel 75.

The sensor member 72 includes a plastic body 76 which extends partially into the end of the axle 22 and extends outwardly therefrom, and a plastic cover 78 which covers the section of the body 76 which extends outwardly from the end of the axle 22. The cover 78 is suitably secured to the body 76. A recess is formed between the body 76 and the cover 78. A central aperture 80 is provided through the body 76 and the cover 78 and aligns with the central aperture 70 through the freeze plug 64. A plurality of L-shaped vents 81 are provided through the periphery of body 76 to provide an air passageway from the space between the freeze plug 64 and the body 76 and the space between the sensor member 72 and the hub cap 38.

The body 76 of the sensor member 72 is fastened to the axle 22 by a bolt 82 which is mounted in the central aperture 80 through the body 76. The bolt 82 threads with the central aperture 70 through the freeze plug 64. The thread form in the freeze plug 64 may be pre-tapped or may be generated using a thread forming bolt.

The central aperture 80 in the body 76 allows for the possibility of an air passage through the body 76 if a hollow bolt 82 is utilized as shown. This allows for the incorporation of a central tire inflation (CTI) in the present system. CTI systems automatically keep tires inflated by passing air from a compressed air reservoir mounted on the trailer 26 to the tires. One possible implementation of a CTI system with the present invention passes air through a tube in the hollow axle 22, then through a swivel connection with a rotating seal to air fittings on the outside of the hub cap 38. The air is then piped to the inflation valves for the tires. A suitably designed hollow bolt 82 allows for the air to pass from the tube in the hollow axle 22 to the rotating seal in the hub cap 38. The sensor member 72 of the present invention allows for CTI but does not economically penalize the majority of applications where CTI is not used.

To protect the bearings 36, 38, the entire axle end area is sealed from moisture, dirt and other contaminants. Suitable venting is provided so that the seals within the wheel mounting apparatus 24 are not subjected to excessive pressure buildup. Depending on the wheel end construction, different methodologies may be used which use suitable vents in the hub cap 38, seals and/or the freeze plug 64. The sensor member 72 of the present invention is compatible with all such approaches. Consequently, the periphery of the body includes the L-shaped venting slots 81 such that pressure on both the front and back of the sensor member 72 remains equalized. As for a conventional wheel end construction, venting and sealing are controlled by the hub cap, freeze plug and bearing seals. It should be noted that, depending on the application and the method of lubrication of the bearings, all parts of the sensor member 72 may be subject to oil splash. The design and material of the sensor member 72 of the present invention allows for operation in this environment.

An electronic circuit assembly 84 is provided between the body 76 and the cover 78 of the sensor member 72. The electronic circuit assembly 84 includes a printed circuit board 86 mounted on the body 76 by suitable means such that the printed circuit board 86 is positioned between the body 76 and the cover 78 of the sensor member 72. A wheel speed sensor is provided on the printed circuit board 86 in the form of an application specific integrated circuit (ASIC) 88. Wires 90 extend from the printed circuit board 86 through the grommet in the freeze plug 64, through the hollow axle 22 to a current supplying controller 92, which as shown is the electronic control module (ECM) of the anti-lock brake system (ABS) of the trailer 26.

Figure 4:
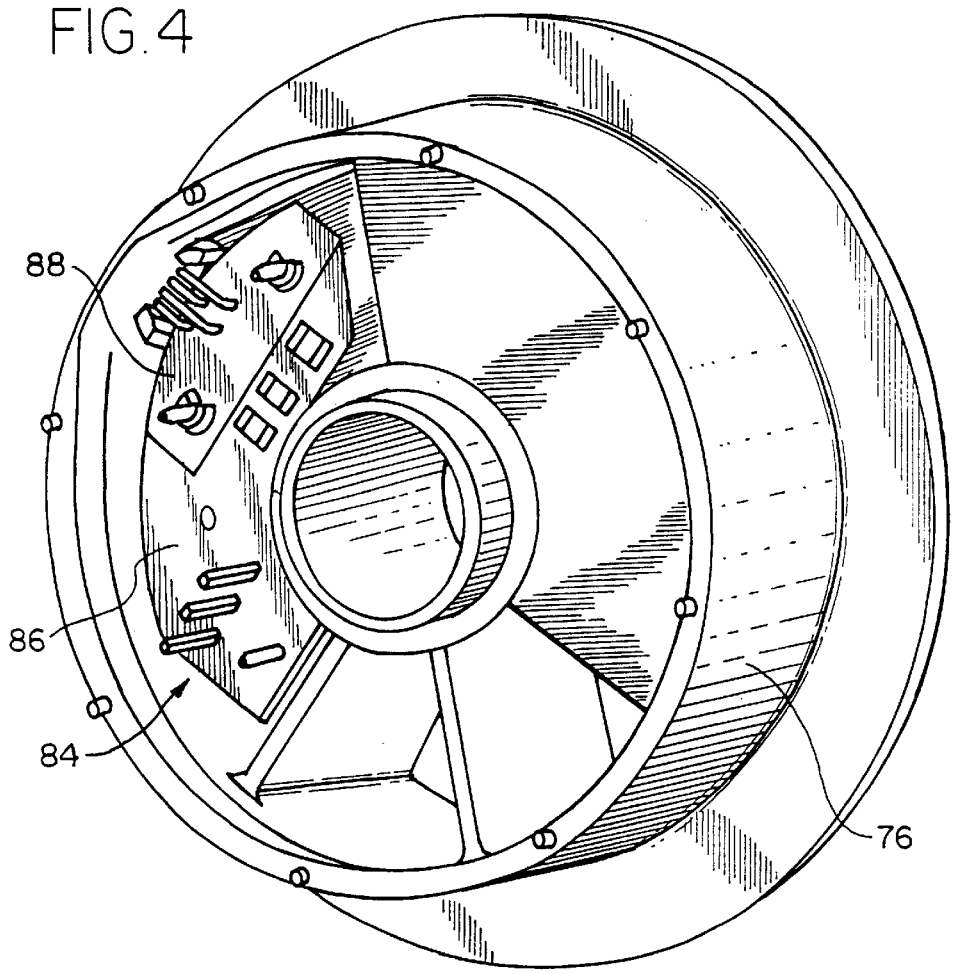
FIG. 4 is a perspective view of a portion of the wheel speed sensor of the present invention.
Figure 5:
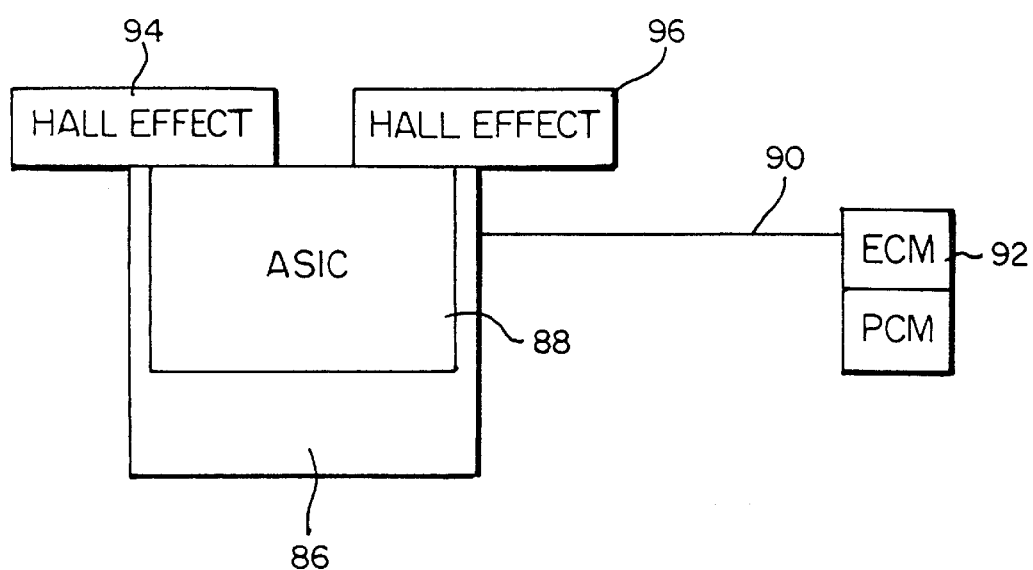
FIG. 5 is a schematic of the ABS system used with the present invention.

The preferred embodiment of the present invention uses "active" technology. As shown in FIGS. 4 and 5, the ASIC 88 includes a pair of hall effect semiconductor elements 94, 96 which are soldered to the printed circuit board 86 at the outermost end thereof and at spaced locations from each other. The face of each hall effect semiconductor sensing element 94, 96 is parallel to the axis of rotation of the axle 22. The hall effect semiconductor elements 94, 96 and the exciting ring 74 are used by the ECM 92 of the ABS (see FIG. 5) to determine the speed of the wheels of the trailer 26.

The second side wall 50 of the hub cap 38 is machined to provide a recess in which the mounting wheel 75 is located. To secure the mounting wheel 75 to the inside of the second side wall 50, the metal second side wall 50 is deformed. This precisely locates the mounting wheel 75 on the hub cap 38. Because the hub cap 38 is precisely mounted on the wheel hub 32 and axle 22 as discussed herein, the mounting wheel 75 is precisely mounted on the wheel hub 32 and axle 22.

The exciting ring 74 is mounted on the inner surface of the mounting wheel 75 and is proximate to, but spaced from the hall effect semiconductor sensing elements 94, 96. Because the mounting wheel 75 is precisely mounted on the wheel hub 32 and axle 22, the exciting ring 74 is precisely mounted on the wheel hub 32 and axle 22. The exciting ring 74 and the sensor member 20 are concentric with each other when mounted. As such, a defined radial gap is provided between the exciting ring 74 and the hall effect semiconductor sensing elements 94, 96. The hall effect semiconductor sensing elements 94, 96 are mounted on the printed circuit board 86 so as to precisely line up with the exciting ring 74 when the hub cap 38 is mounted on the wheel hub 32.

Because the face of each hall effect semiconductor sensing element 94, 96 is parallel to the axis of rotation of the axle 22, a constant gap is maintained by the bearings 36. Axial movement of the wheel hub 32 does not have a significant effect and no gap adjustment is required. The gap is set by design, and gap variation is directly controlled by the bearing 36. The gap is dependent on the concentricity of the mounting of the exciting ring 74 within the hub cap 38.

In the preferred implementation, the exciting ring 74 is a multi-pole magnet fabricated using ferrite in a plastic matrix material. The magnet has twenty-five north and south poles (twenty-five pole pairs). Because the exciting ring 74 is carried on the mounting wheel 75 mounted inside the hub cap 38, the magnet poles can be located precisely both circumferentially around the sensor member 72 and radially relative to the sensor member 72. This positioning eliminates many of the difficulties associated with the prior art stamped exciting ring. As such, the gap between the exciting ring 74 and the hall effect semiconductor sensing elements 94, 96 is radial so that the gap is directly controlled by the position of the bearings 36 and is not influenced by axial movement of the wheel hub 32.

In operation, the wheel hub 32, the hub cap 38, the mounting wheel 75 and the exciting ring 74 rotate relative to the fixed axle 22 and the sensor member 72 mounted thereon. The controller 92 supplies electric current to the sensor member 72 which is a current sink. The hall effect semiconductor sensing elements 94, 96 sense whether a north pole or a south pole of the exciting ring 74 is present. If a north pole is present, the hall effect semiconductor sensing elements 94, 96 sink 14 mamps, for example, from the controller 92, and if a south pole is present, the hall effect semiconductor sensing elements 94, 96 sink 7 mamps, for example, from the controller 92. This information is conveyed to another part of the ASIC 88, to obtain a square wave as the poles are going by. The controller 92 determines how many times the sensor member 72 switches between 14 mamps and 7 mamps. This change happens fifty times every revolution of the tire.

The frequency of the change is proportional to the wheel speed. This information is used by the ABS to function in a like manner to how a conventional wheel speed sensor information is used to slow the trailer 26, if necessary. If ABS is not provided on the trailer 26, the information is sent to a current supplying controller on the trailer which uses this information accordingly.

The outermost diameter of the sensor member 72 is smaller than the inner diameter of the washer 58, the inner adjusting nut 60 and the outer jam nut 62. As a result, the outer jam nut 62, the inner adjusting nut 60 and the washer 58 can be moved over the sensor member 72 such that the wheel hub 32, complete with the bearings 34, 36 and the mounting wheel 75 and the exciting ring 74, can be simply moved out over the sensor member 72. This presents a significant advantage over prior art systems in which the sensor member had to be removed in order to change the wheel hub.

Figure 6:
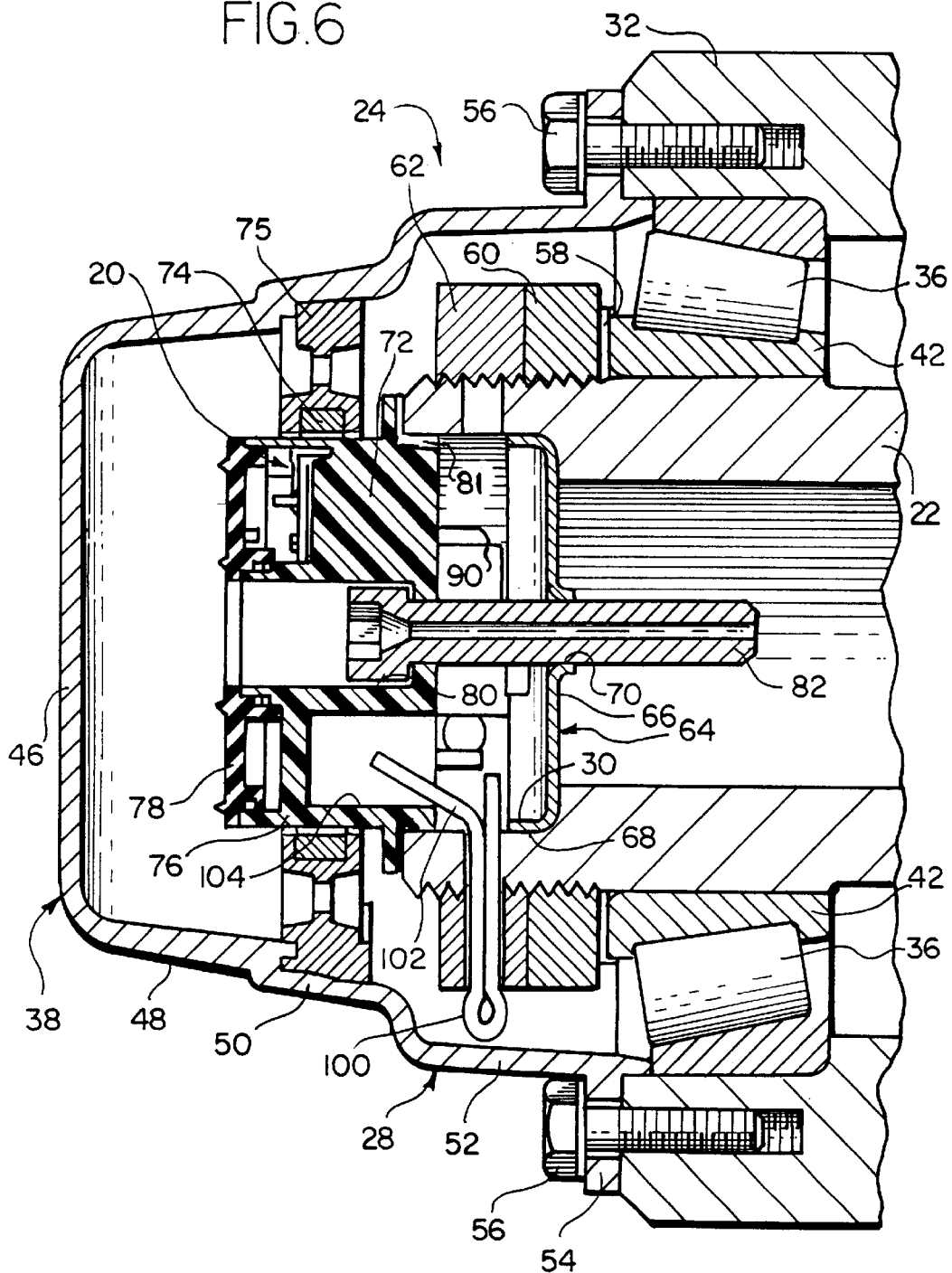
FIG. 6 is a partial cross-sectional view of an alternate wheel mounting apparatus which includes the wheel speed sensor which incorporates the features of the invention.
Figure 7:
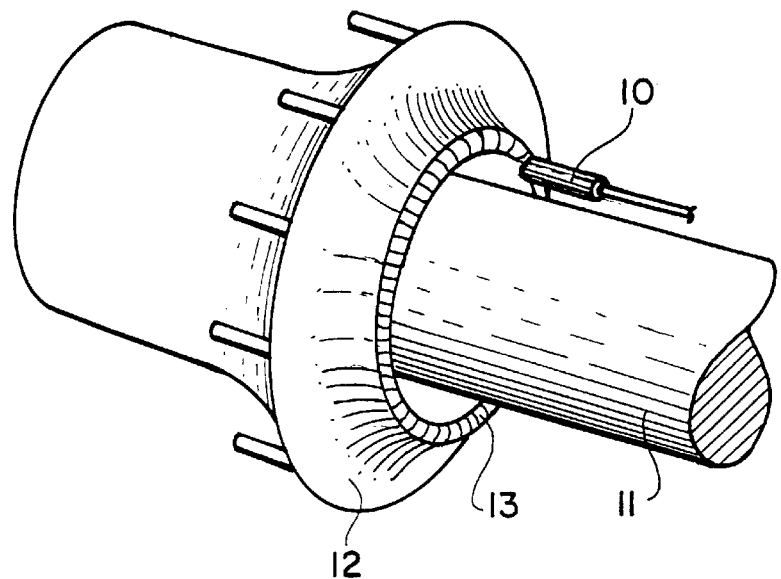
FIG. 7 is a perspective view of a prior art sensing system.
Figure 8:
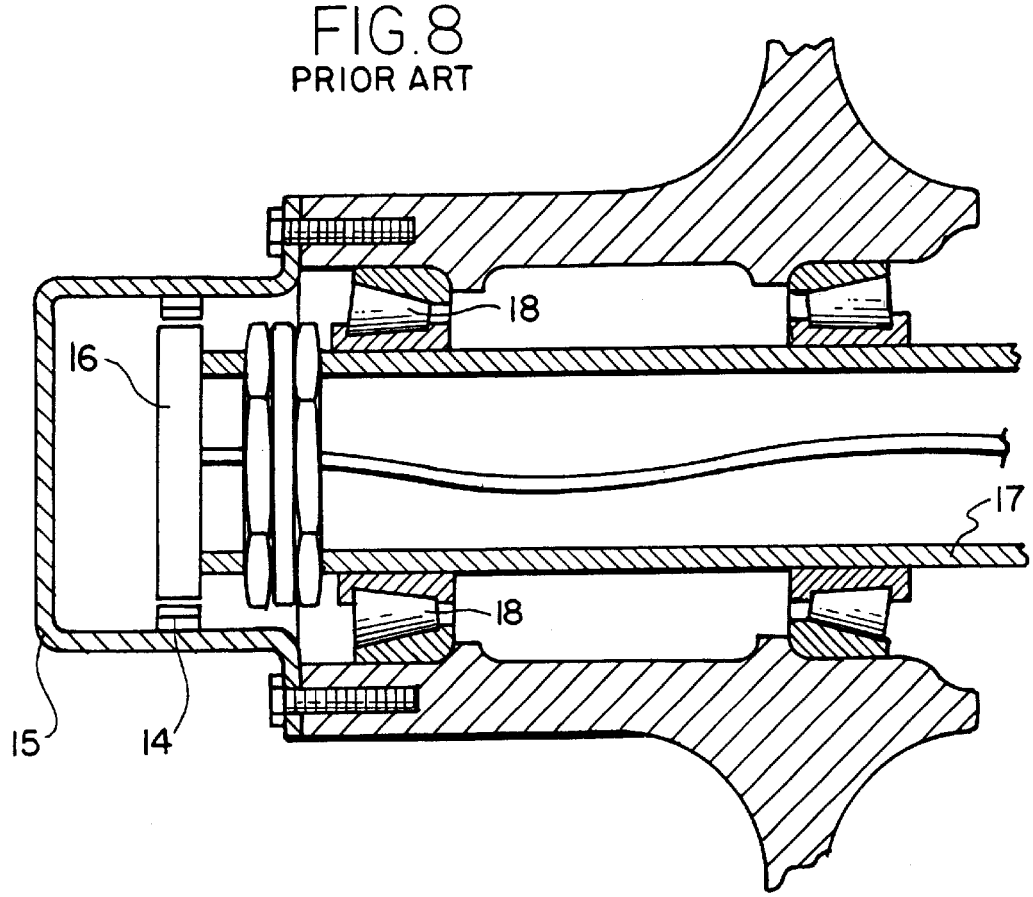
FIG. 8 is a partial cross-sectional view of an axle and a cross-sectional view of a wheel mounting apparatus which includes a prior art wheel speed sensor.

As shown in FIG. 6, some wheel end constructions use a cotter pin 100 to lock the jam nut 62 in place. One leg 102 of the cotter pin 100 has to be bent outwards after the cotter pin 100 is inserted through an aligned apertures through the jam nut 62 and the axle 22. The present invention accommodates the use of a cotter pin 100 as shown in FIG. 6. A portion of the rear of the body 76 is provided with a recess 104 to provide a space for the bent leg 102 of the cotter pin 100.

To assemble the wheel mounting apparatus 24 using a cotter pin 100, the bearings 34, 36 are adjusted to the required specifications by adjusting the washer 58, the adjusting nut 60 and the jam nut 62. The cotter pin 100 is then inserted through the aligned apertures through the jam nut 62 and the axle 22. Thereafter, the leg 102 of the cotter pin 100 is bent outwards toward the end of the axle 22. The body 76 of the sensor member 72 is then installed and the bent leg 102 of the cotter pin 100 is inserted into the recess 104 provided in the body 76 of the sensor member 72.

It should be noted that when the cotter pin 100 is used to lock the jam nut 62, the wheel hub 32 cannot be removed without first removing the body 76 of the sensor member 72 to gain access to the bent leg 102 of the cotter pin 100. Thus, one of the advantages is lost with this style of bearing adjustment, however, this common type of wheel end construction can be accommodated in the present invention. With this embodiment, the L-shaped vents 81 provided in the sensor body 76 for venting may not be required as the apertures for the cotter pin 100 provides this function. In the preferred embodiment, however, the L-shaped vents 81 are still provided on the sensor body 76 so that the sensor member 72 is not restricted to this specific type of axle 22.

It is to be understood that it is envisioned that a variable reluctance (VR) sensor can be used to replace the hall effect semiconductor elements 94, 96. While the use of VR sensors is envisioned, some practical difficulties can arise in the present invention. For example, providing the recess 104 for the bent leg 102 of the cotter pin 100 means that space may not be available for the wire coils of the VR sensor, especially if multiple poles are required to compensate for any irregularities in a conventional exciter ring. These irregularities would be more pronounced in this case because of the reduced diameter of the exciter ring 74 of the present invention. Irregularities would be proportionately greater in relation to the diameter. The aperture 80 through the sensor body 76 would add to the difficulty of the VR sensor implementation.

The present invention can be modified such that the end of the axle 22 is deliberately sealed. The L-shaped vents 81 at the back of the sensor body 76 are also eliminated and the freeze plug 64 seals the axle 22.

Alternatively, the present invention can be modified such that the freeze plug 64 is eliminated and the sensor body 76 is used to seal the axle 22. The L-shaped vents 81 at the back of the sensor body 76 are also eliminated. The vent in the hub cap 38 is also be eliminated.

While preferred embodiments of the present invention are shown and described, it is envisioned that those skilled in the art may devise various modifications of the present invention without departing from the spirit and scope of the appended claims.

The invention claimed is:

1. A wheel sensor configuration for a vehicle comprising:
   an axle defining a centerline;
   a wheel hub surrounding said axle;
   at least one nut mounted on an end of said axle, said nut having a predetermined inner diameter thereby defining an inner diameter dimension around said axle;
   a hub cap mounted to said wheel hub;
   an exciting element mounted within said hub cap;
   a member mounted on an end of said axle and having a portion which extends outwardly from said end of said axle;
   a sensor provided on said portion of said member, said sensor and said exciting element being concentrically arranged from each other relative to said centerline of said axle and being radially spaced apart from each other relative to said centerline of said axle, said sensor being configured to sense said exciting element, said sensor having an outermost extent that does not extend beyond said inner diameter dimension of said nut, said sensor being spaced from said exciting element; and
   a controller connected to said member to determine a predetermined property of said wheel hub.

2. A wheel sensor configuration as defined in claim 1, wherein said predetermined property of said wheel hub is the speed of rotation of said wheel hub.

3. A wheel sensor configuration as defined in claim 1, wherein said exciting element is mounted to a mounting wheel disposed in said hub cap.

4. A wheel sensor configuration as defined in claim 3, wherein said mounting wheel is disposed in a machined bore in said hub cap and said hub cap is thereafter deformed.

5. A wheel sensor configuration as defined in claim 1, wherein said member has a passageway therethrough for accepting a fastener therethrough.

6. A wheel sensor configuration as defined in claim 5, further including a plug member mounted within said axle and spaced from said member, the fastener extending through said plug member.

7. A wheel sensor configuration as defined in claim 1, wherein said member has at least one vent provided therethrough.

8. A wheel sensor configuration as defined in claim 7, further including a plug member mounted within said axle and spaced from said member.

9. A wheel sensor configuration as defined in claim 1, further including an integrated circuit, said integrated circuit including said sensor.

10. A wheel sensor configuration as defined in claim 1, wherein said sensor comprises at least one Hall effect semiconductor element.

11. A wheel sensor configuration as defined in claim 1, wherein said exciting element is a magnet.

12. A wheel sensor configuration as defined in claim 1, wherein said magnet includes twenty-five pole pairs.

13. A wheel sensor configuration as defined in claim 1, wherein said controller is an electronic control module of an anti-lock brake system.

14. A wheel sensor configuration as defined in claim 1, wherein said axle has an aperture therethrough and said sensor has a recess therein, such that a cotter pin can be accepted through said aperture in said axle and into said recess in said sensor.

15. A wheel sensor configuration comprising:
   an axle defining a centerline;
   a wheel hub mounted on said axle;
   at least one bearing disposed between said axle and said wheel hub;
   a hub cap mounted to said wheel hub;
   an exciting element disposed generally within said hub cap;
   a member disposed at an end of said axle; and a sensor on said member, said sensor and said exciting element being concentrically arranged from each other relative to said centerline of said axle and being radially spaced apart from each other relative to said centerline of said axle, said sensor configured to sense said exciting element, said member and said at least one bearing configured such that said at least one bearing is removable from said axle without having to disengage said member and said sensor from the end of said axle.

16. A wheel sensor configuration as defined in claim 15, wherein said bearing is removable from said axle generally along a longitudinal axis of said axle.

17. A wheel sensor configuration as defined in claim 15, wherein said member is configured such that said bearing is slidable over said member.

18. A wheel sensor configuration as defined in claim 15, wherein said exciting element is mounted to a mounting wheel disposed in said hub cap.

19. A wheel sensor configuration as defined in claim 18, wherein said mounting wheel is disposed in a machined bore in said hub cap and said hub cap is thereafter deformed.

* * * * *